June 9, 1936.    O. L. NEAL    2,043,861
PATCH BOLT
Filed June 17, 1935
Fig. 1.
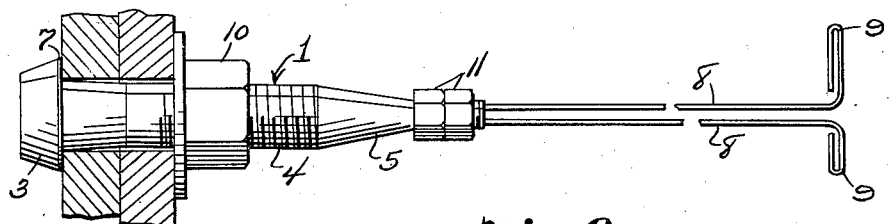
Fig. 2.
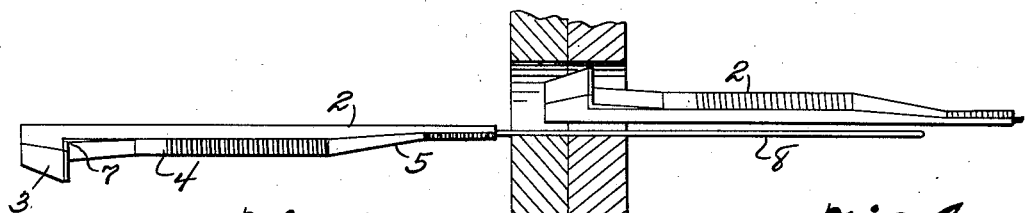
Fig. 3.             Fig. 4.
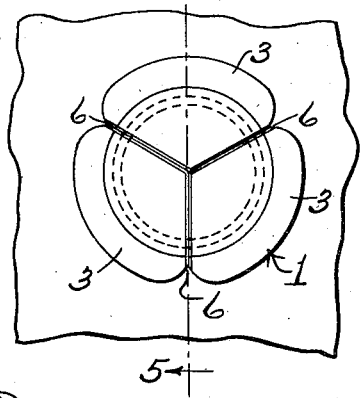  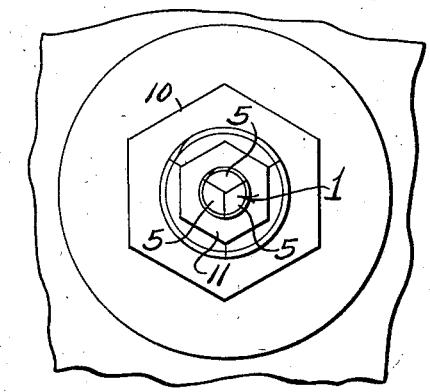
Fig. 5.
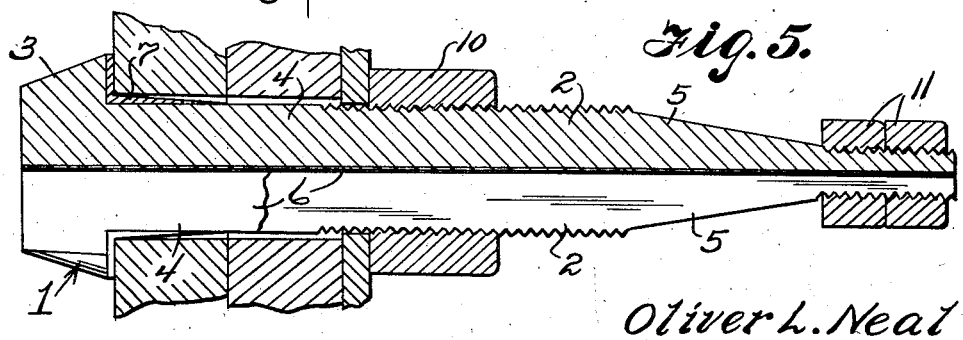
Oliver L. Neal
INVENTOR
BY Victor J. Evans & Co.
ATTORNEY Patented June 9, 1936

2,043,861

UNITED STATES PATENT OFFICE 2,043,861

PATCH BOLT

Oliver L. Neal, Beaumont, Tex.

Application June 17, 1935, Serial No. 27,078

1 Claim. (Cl. 85—1)

This invention relates to bolts especially adapted for replacing rivets or like fasteners employed for securing together structures which are only accessible from one side thereof and has for the primary object the provision of a device of this character which includes three or more sections, each section composed of a body portion and a head portion having applied thereto soft metallic material and an operating medium, whereby each section may be passed through openings of the structure from one side thereof and the sections then assembled into bolt formation and drawn into the holes with the head sections fully overlapping the holes at one face of the structures so that when a nut is applied, the structures will be tightly secured together with effective seals provided between the bolt sections and the latter and the structures.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, showing a bolt constructed in accordance with my invention and mounted in holes of a pair of plate-like members forming a part of a structure.

Figure 2 is a fragmentary view, partly in section, showing the means of assembling the bolt from one side of the structure.

Figure 3 is an end view illustrating the bolt.

Figure 4 is a view similar to Figure 3 showing the other end of the bolt with nuts applied thereto.

Figure 5 is a sectional view taken on the line 5—5 of Figure 3.

Referring in detail to the drawing, the numeral 1 indicates a bolt composed of three or more bolt sections 2. It is to be understood that the sections 2 extend longitudinally of the bolt. Each section consists of a head portion 3, a body portion 4 and a shank portion 5. The body portions 4 when assembled form the bolt 1 with a head of a shape as shown in Figure 3 so that said head will have a shouldered portion capable of fully overlapping an opening of a structure. The body portions 4 are screw threaded, as well as a part of the shank portion 5. The matching faces of the head portions and body portions are coated with a soft metallic material 6. Also soft metallic material 7 is applied to the outer faces of the body portions 4 and the shouldered parts of the head portions 3. The material 7 may taper in the direction of the shank portions 5, as suggested in Figure 2.

Rods or similar elements 8 are suitably secured to the ends of the shank portions 5 and have their free ends bent to form handles 9. A nut 10 is provided for threading onto the body portions 4 after the assembling thereof into bolt formation. Prior to applying the nut 10 and to retain the bolt sections assembled, nuts 11 are threaded to the shanks 5, one of the nuts 11 acting as a lock nut to the other nut 11. The nut 10 may be passed over the nuts 11 to be threaded onto the bolt after the assemblage of the sections of said bolt. The members or rods 8 may be readily broken from the shanks after the assembling of the bolt.

In operation, to apply a bolt of the character described to a structure composed of two or more members having aligned openings, the sections of the bolt are first passed one at a time through the openings from one side of the structure and then the sections are brought into bolt formation and drawn into the openings with the head portions 3 contacting one another and one of the members of the structure. The nuts 11 are then applied to hold the bolt sections assembled. The members or rods 8 are broken or severed from the shank portions 5. The nut 10 along with the washer is threaded onto the bolt against the structure, bringing about the adherence of the soft metallic materials of the bolt sections and also causing an adherence of the soft metallic material 7 to the structure. Thus it will be seen that the bolt sections are sealed together as well as being sealed to the structure. After the foregoing described operation has been completed, the bolt or body portions 4 thereof may be cut or severed adjacent to the nut 10.

Having described the invention, I claim:

A bolt comprising companion sections each including a head portion having a periphery forming part of a cylinder, a body portion and a shank portion having a periphery forming part of a cylinder, and the latter being of a diameter smaller than the diameter of said body portion, screw threads formed on the body and shank portions, a nut threaded on the shank portions for securing the sections assembled to one another, rods secured to the ends of the shank portions for moving the sections into assembled position and breakable from said shank portions after the application of the nut to the shank portions, and a second nut freely movable over the first nut and threaded on the body portions.

OLIVER L. NEAL.